(12) United States Patent
Santhar et al.

(10) Patent No.: US 12,240,181 B2
(45) Date of Patent: Mar. 4, 2025

(54) 3D PRINTING WITH VIRTUAL REALITY INTEGRATION

(71) Applicant: International Business Machines Corporation, Armonk, NY (US)

(72) Inventors: Sathya Santhar, Ramapuram (IN); Samuel Mathew Jawaharlal, Chennai (IN); Balamurugaramanathan Sivaramalingam, Paramakudi (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 17/360,024

(22) Filed: Jun. 28, 2021

(65) Prior Publication Data

US 2022/0410487 A1    Dec. 29, 2022

(51) Int. Cl.
*B29C 64/393*    (2017.01)
*B33Y 50/02*    (2015.01)
*G06F 3/04815*    (2022.01)
*G06T 19/20*    (2011.01)

(52) U.S. Cl.
CPC .......... *B29C 64/393* (2017.08); *B33Y 50/02* (2014.12); *G06F 3/04815* (2013.01); *G06T 19/20* (2013.01)

(58) Field of Classification Search
CPC ... B29C 64/393; B33Y 50/02; G06F 3/04815; G06T 19/20
See application file for complete search history.

(56) References Cited

U.S. PATENT DOCUMENTS

| | | | |
|---|---|---|---|
| 10,275,909 B2 | 4/2019 | Pri-Tal et al. | |
| 10,331,110 B2 | 6/2019 | Lection et al. | |
| 10,632,682 B2 | 4/2020 | Su et al. | |
| 10,664,976 B2 * | 5/2020 | Hu | G06F 18/22 |
| 2008/0300711 A1 * | 12/2008 | Day | G06F 30/20 |
| | | | 700/109 |
| 2011/0306417 A1 * | 12/2011 | Sheblak | A63F 13/52 |
| | | | 463/32 |
| 2016/0320771 A1 * | 11/2016 | Huang | B33Y 50/00 |
| 2018/0059644 A1 * | 3/2018 | Lection | G05B 19/4099 |
| 2018/0114264 A1 * | 4/2018 | Rafii | G06T 15/50 |
| 2018/0147062 A1 * | 5/2018 | Ay | G06T 19/20 |
| 2018/0357543 A1 * | 12/2018 | Brown | G06N 3/044 |

(Continued)

FOREIGN PATENT DOCUMENTS

| | | |
|---|---|---|
| CN | 107443751 A | 12/2017 |
| CN | 212302428 U | 1/2021 |

OTHER PUBLICATIONS

Knott, David. CInDeR: collision and interference detection in real time using graphics hardware. Diss. University of British Columbia, 2003. (Year: 2003).*

(Continued)

*Primary Examiner* — Robert E Fennema
*Assistant Examiner* — Vi N Tran
(74) *Attorney, Agent, or Firm* — Daniel M. Yeates

(57) ABSTRACT

Deviations in a 3D printing process can be detected during printing via sensors or by user observation. A user can manipulate and evaluate any deviations from a 3D model via a simulation of the work-in-progress object via virtual reality. The user can also make changes to the model, resulting in the printer completing the same work-in-progress object based on the revised model.

20 Claims, 6 Drawing Sheets

(56) References Cited

U.S. PATENT DOCUMENTS

| | | | |
|---|---|---|---|
| 2019/0039316 A1* | 2/2019 | Su | G06F 3/1284 |
| 2019/0056717 A1* | 2/2019 | Kothari | G05B 6/00 |
| 2019/0146599 A1* | 5/2019 | Gunnarsson | G06F 3/0346 |
| | | | 345/156 |
| 2019/0346830 A1* | 11/2019 | de Souza Borges Ferreira | |
| | | | G05B 19/4099 |
| 2019/0377843 A1* | 12/2019 | Chen | G06F 30/23 |
| 2021/0004075 A1* | 1/2021 | Protter | G06N 3/08 |
| 2021/0048802 A1* | 2/2021 | Pal | G05B 19/41885 |
| 2021/0229364 A1* | 7/2021 | McLeod | B33Y 50/02 |
| 2023/0043252 A1* | 2/2023 | Luan | G06T 7/149 |
| 2023/0154106 A1* | 5/2023 | Shimizu | G06V 10/761 |
| | | | 345/419 |

OTHER PUBLICATIONS

Cali et al., "3D-Printing of Non-Assembly, Articulated Models," University College London, Nov. 1, 2012, 8 pages.

Jon-A-Tron, "3D Printed Linear Motion (MVMT 92)," instructables workshop, Printed Jun. 25, 2021, 77 pages, https://www.instructables.com/id/3D-Printed-Linear-Motion/.

"Cool 3D Printed Mechanisms Timelapse episode 19 FLSUN QQ-S," YouTube, May 16, 2019, 2 pages, https://www.youtube.com/watch?v=1FnqPD91B11.

Cuellar et al., "Ten guidelines for the design of non-assembly mechanisms: The case of 3D-printed prosthetic hands," ResearchGate, Proceedings of the Institution of Mechanical Engineers Part H Journal of Engineering in Medicine, Aug. 2018, 10 pages, https://www.researchgate.net/publication/327071655_Ten_guidelines_for_the_design_of_non-assembly_mechanisms_The_case_of_3D-printed_prosthetic_hands.

Odom, "3D Printed Linear Motion—Fusion 360 Demo," YouTube, Oct. 3, 2017, 2 pages, https://www.youtube.com/watch?v=PBuCaaw8TqY&feature=youtu.be.

"METU OpenCourseWare," Middle East Technical University, Printed Jun. 25, 2021, 3 pages, http://ocw.metu.edu.tr/pluginfile.php/6467/mod_resource/content/6/ch6/6-2.htm.

Mechcadcam, "What is the difference between the Tolerance and Allowance," Aug. 3, 2017, 2 pages, https://mechcadcam.quora.com/What-is-the-difference-between-the-Tolerance-and-Allowance.

* cited by examiner

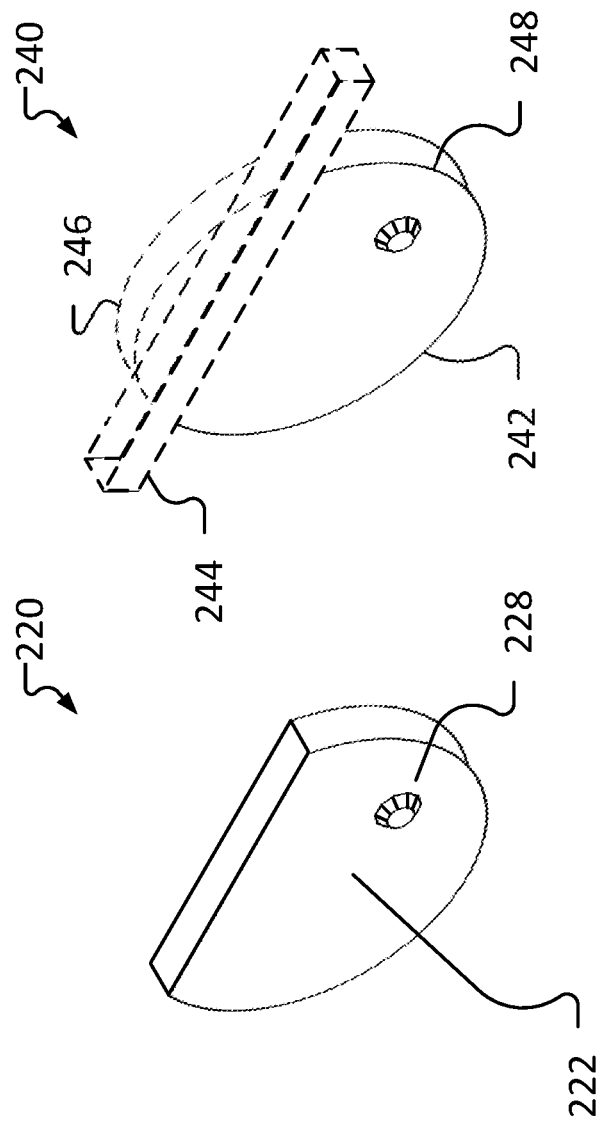
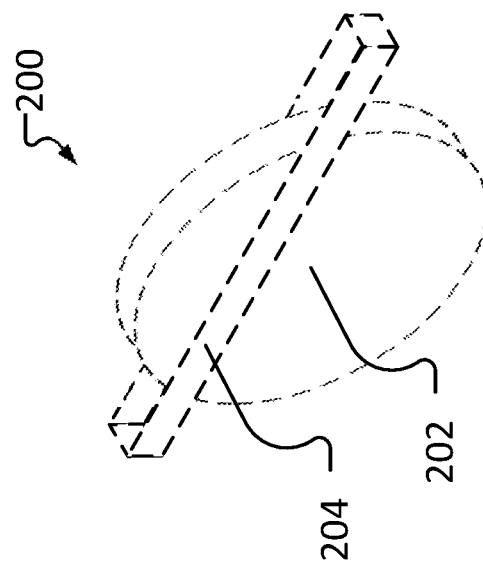
FIG. 2A
FIG. 2B
FIG. 2C

3D PRINTING WITH VIRTUAL REALITY INTEGRATION

BACKGROUND

The systems and methods of the present disclosure relate to 3D printing and virtual reality.

Three-dimensional (3D) printing, sometimes known as "additive manufacturing," generally refers to the concept of manufacturing an object from a digital model. 3D printing can be performed in a variety of ways, such as "fused deposition modeling" (adding layers of a thermoplastic), and can produce complex shapes that may be difficult or impossible to construct by hand.

Virtual reality (VR) refers to technology enabling a user to experience simulated situations. VR typically includes a headset with a screen, such that the user's entire field of vision is replaced with a displayed image. Further, VR technology enables simulating the user's presence in the environment (typically via motion tracking), such that the image on the screen is updated based upon how the user's head moves. This effectively enables the user to "look around" in a virtual environment.

SUMMARY

Some embodiments of the present disclosure can be illustrated as a method. The method comprises receiving a 3D model representing a virtual object. The method also comprises monitoring (via sensors) 3D printing of a physical object. The method also comprises comparing (based on the monitoring) the physical object to the 3D model. The method also comprises generating (based on the comparing) a predicted model. The method also comprises transmitting the predicted model to a virtual reality interface. The method also comprises presenting the predicted model to a user via the virtual reality.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

FIG. 2A is a 3D model of an example object to be printed, consistent with several embodiments of the present disclosure.

FIG. 2B is a diagram depicting a work-in-progress object being 3D printed based upon the 3D model (but including a printing defect), consistent with several embodiments of the present disclosure.

FIG. 2C is a diagram depicting a predicted final state of the work-in-progress object including the defect, consistent with several embodiments of the present disclosure.

Figure 1:
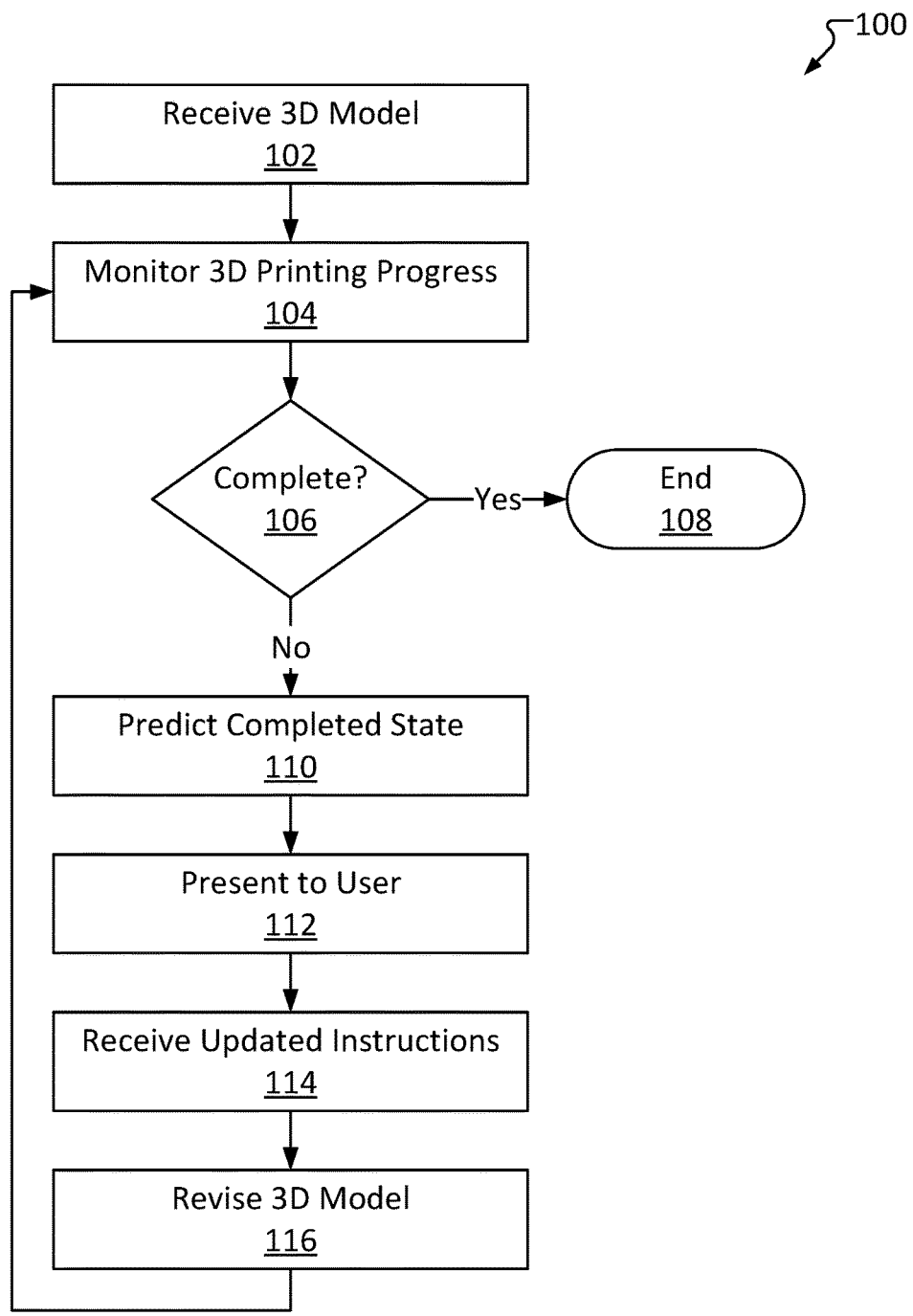
FIG. 1 is a high-level method for virtual-reality-enhanced 3D printing monitoring, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to manage progress of 3D printing via virtual reality (VR). More particular aspects relate to evaluating a state of a 3D printing project, predicting a final state of the project, providing the final state to a VR interface, receiving feedback via the VR interface, and adjusting a model based on the feedback.

3D printing systems generally create a real-world 3-dimensional object based upon a digital 3D model. However, many problems are possible during the printing process. For example, printing errors can include missing material such as holes in a finished object, extra material such as bumps on the object, etc. Another possible printing problem, a "scaling problem," can result from miscalibration or malfunction of the 3D printer. For example, a component that is designed to be 3 centimeters (cm) wide may be printed to be 3.5 cm wide. In many instances, this may be relatively harmless, but in higher-performance applications (such as 3D-printed machine parts or components of more complex designs), such an issue can impede performance of an overall system.

In addition, 3D printing processes are often time-intensive (usually on the order of hours to days) and generally cannot be interrupted without introducing problems. If an object is being printed and a user suspects a printing error may have occurred, the user may wish to suspend printing, remove the partially-printed object from the printer, manipulate or otherwise inspect the partially-printed object to evaluate it for flaws, replace the partially-printed object back within the printer, and resume printing. Unfortunately, several factors can prevent this from being feasible; for example, many 3D printing processes utilize materials that cure or bond over time after printing. Thus, suspending printing of an object for a given amount of time before resuming, if the object is being printed via such a process, may compromise the integrity of the final object (for example, portions printed after the pause may fail to properly adhere to portions printed before the pause).

Systems and methods consistent with the present disclosure enable monitoring of 3D printing progress, detecting deviations from a design/model, enabling users to interact, via virtual reality, with the object, and revising the model as it is being printed. This advantageously enables automatically identifying deviations in the printing process (e.g., errors, omissions, etc. in portions that have already been printed) and presenting users with the ability to examine the deviation in detail without cancelling the 3D printing process.

As an example, a user may instruct a 3D printer to print a gear having multiple teeth. The gear may be designed to mesh with a toothed rod (to form a "rack and pinion" system), and thus the teeth of the gear may need to be within certain tolerances. The printing instruction may include a digital model of the gear to be printed. While the gear is being printed, sensors can observe the printing process to allow a system to create and maintain a second digital model of the portions of the gear that have been printed so far. In other words, the second model describes the "work-in-progress" gear. The system can then compare the first model to the second model. Based on this comparison, deviations between the first and second models can be detected. For example, the work-in-progress gear may have been printed with additional extraneous material filling a gap between two teeth. This can be detected by the sensors, and the second model can be updated to represent the extraneous model. When the models are compared, the extraneous material may be identified as a deviation. The work-in-progress gear may also have been printed with a missing tooth, which can similarly be identified as a deviation. Notably, this monitoring and comparing can be performed during the printing process.

Further, the sensors may enable detecting deviations that a user might otherwise not be able to detect by merely observing the printing. For example, ultrasonic sensors can identify discrepancies in density of the work in progress.

In addition, portions of the gear (and therefore any deviations in the printing of those portions) may only be visible briefly. For example, a part of the gear may be hollow with an internal truss structure. Deviations in the truss structure may not be visible once the hollow part is fully enclosed, even if the overall printing of the rest of the gear is still incomplete. Continuous monitoring of the printing process can enable automatically detecting deviations even with no users present.

Further, systems and methods consistent with the present disclosure enable predicting a final state of an object based upon a model of the object and a work-in-progress state of the object being 3D printed. This further enables visualization of the ramifications of the defect. For example, 3D model of a gear having multiple teeth of equal size may be printed. During printing, after a single tooth of the gear has been printed, a system may identify that the tooth is larger than the 3D model indicates it should be. This deviation may be identified and integrated with the 3D model to produce a predicted model of what the final gear is expected to look like. In ordinary situations, a user may view the printed tooth, but may struggle to determine that the tooth is oversized without seeing the other teeth for comparison. The predicted model, including the oversized printed tooth as well as the rest of the teeth (which may not have been printed yet, but may still be predicted to be printed in the correct size), may enable a user to quickly and easily see ramifications of the deviation, such as that the completed gear including this deviation may not function properly for some intended purpose. Alternatively, if the tooth is only slightly larger than it should be (e.g., within a margin of error), the user may decide that the deviation is acceptable and the gear will still suffice for the intended purpose (e.g., the gear may still be able to mesh with another gear, even with the oversized tooth).

In some instances, the 3D model may also include planned or intended functionality data. For example, the object to be printed may include multiple parts designed to move; this motion can be represented and described in the functionality data. The functionality data may be included as metadata of the model. As an example, a 3D model may define a wheel and a frame to be printed. The example 3D model may be bundled with metadata including functionality data describing that the wheel is intended to rotate freely around a specific axis and that the wheel is to be mounted in a given position relative to the frame. To illustrate, the functionality data, in conjunction with the wheel model, could be used to animate the model wheel rotating as intended (e.g., about the specific axis, within the frame, etc.). This animation may be part of a design process undertaken via a computer-aided design (CAD) program in order to check that the wheel will be able to rotate freely (e.g., that the frame and wheel, as designed, will not collide during normal operation). Systems and methods consistent with the present disclosure can simulate functionality of a predicted final object including an identified deviation, enabling identification of whether the deviation has an impact on functionality (e.g., whether a wheel will still be able to turn, etc.).

Continuing with the "wheel and frame" illustrative example, a 3D printer may print part of the wheel based on the input 3D model, and sensors may analyze the resulting work-in-progress wheel. However, the work-in-progress wheel may include a deviation, such as a bump of additional extraneous printing material deposited on the wheel. While a user may be able to see a bump on a partially-printed wheel, the user may struggle to classify a severity of the issue. For example, in some instances, the bump may be so small as to essentially be strictly a cosmetic concern; the final wheel may still function as designed by rotating freely around the axis and within the frame. If the detected bump is large enough to make contact with the frame when the wheel is rotated, rotation of the wheel may be hindered (e.g., the bump may scrape against the frame, resulting in some frictional braking on the wheel's rotation) or even prevented (e.g., the bump may collide with the frame and jam/bind the wheel entirely). Of course, severity can vary based on intended application as well. For example, even a minor, seemingly "cosmetic" bump may have non-negligible effects on distribution of mass/moment of inertia, so while a wheel for a rolling office chair may suffer no appreciable performance issues with or without a small bump, a high-speed flywheel having an unintended bump may be unbalanced and fail catastrophically (e.g., tear itself apart) as a result.

Ordinarily, it may be difficult for a user to ascertain the severity of the bump without being able to assemble and test the wheel, which may not be possible before printing is completed. If the deviation is "fatal" to the project (e.g., if the bump is so large as to prevent the wheel from rotating as required), completing printing according to the initial input may be a waste of resources such as materials and time, as the final product may need to be discarded once the problem is confirmed via testing and an entirely new wheel may need to be printed. However, using systems and methods consistent with the present disclosure, the detected deviation can be used to generate a predicted model representing a predicted final state of the wheel (including the bump) should printing continue as initially instructed. The bundled functionality data, describing how the wheel is intended to rotate and where the frame is to be mounted, may be used in conjunction with the predicted model to simulate the wheel (including the bump) rotating as intended about the specific axis & within the frame. This way, a severity of the deviation can be evaluated before printing is complete. For example, a user may be presented with an animation of the wheel rotating, allowing the user to see whether the bump will make contact with the frame.

In some instances, the predicted functionality can be simulated automatically, and a user may be alerted if the deviation exceeds a deviation threshold. For example, the deviation threshold may dictate that a deviation greater than 10 cubic centimeters ($cm^3$), measured over the entire work-in-progress object, is large enough to merit alerting a user, while a deviation less than 10 $cm^3$ is within acceptable levels. The deviation threshold can be set by a user, and can be adjusted for different projects. For example, a high-speed flywheel may have a relatively strict deviation threshold of 10 $mm^3$, while an office chair wheel may have a relatively lax threshold of 10 $cm^3$. This way, user alerts can be tailored to balance alerting the user to genuine problems and allowing for minor discrepancies.

As an example, once a bump is detected, the system may generate a predicted model and simulate rotation of the wheel, checking periodically whether the bump overlaps with the frame (indicating that their physical counterparts would collide). If a collision is detected, a notification may be generated and transmitted to a user. In some instances, printing may automatically halt upon detection of a deviation that affects functionality until a user has decided how to proceed, so as to conserve materials due to a likelihood that the printing project may be abandoned/restarted. In some instances, the user can configure whether and under what circumstances printing is to be halted/the user is to be notified. For example, a user may set a preference dictating that printing should only be halted if a fatal deviation is identified, so if the system detects only a minor or cosmetic deviation, the system may continue printing to conserve time.

In some instances, the system may present options to the user for how to proceed based on a nature and/or severity of a detected deviation. For example, the system may determine and indicate that an extraneous bump could be sanded down or that an extraneous void could be filled, restoring functionality. The user may then decide how to proceed.

In some instances, the predicted model may be presented to the user even if no deviations have been identified. This may, for example, allow the user to interact with and/or inspect the object as it is printed. Even without deviations, this additional level of interactivity may enable a user to notice a design flaw or similar issue.

Further, the user may opt to modify the design of the object even if printing has not completed. As an example, a system may detect a deviation on a wheel, generate a predicted model of the wheel including the deviation, simulate turning functionality of the predicted wheel, identify that the predicted wheel, when turned, may collide with a planned frame, resulting in impaired functionality of the wheel, and notify a user that the wheel may no longer rotate freely due to the detected deviation. The user may then review the predicted model (such as in a virtual reality environment) and decide that the wheel and frame system will not perform as desired if printing continues. In response, the user may adjust the design of parts of the project that have not yet been printed. For example, the user may enlarge the frame to provide additional clearance so that the deviation no longer makes contact. This way, the wheel may be restored to its intended functionality (e.g., the wheel may once again be able to rotate freely). Notably, this entire process may be performed even if only a portion of a wheel has been 3D printed (i.e., before printing the rest of the wheel and any of the frame). This may improve 3D printing systems and methods by advantageously conserving resources and enhancing adaptability.

FIG. 1 is a high-level method 100 for virtual-reality-enhanced 3D printing monitoring, consistent with several embodiments of the present disclosure. Method 100 comprises receiving an initial 3D model at operation 102. Operation 102 may include, for example, receiving a print instruction from a 3D printing application executing on a computer. For example, a user may design a 3D model of an object via a CAD program and decide to print it. In order to start the 3D printing process, the user may instruct the program to transmit the 3D model to a 3D printer. Operation 102 may include receiving the 3D model, such as via intercepting the print instruction from the application or being sent a copy from the 3D printer. The model received at operation 102 may be, for example, a computer-aided design (CAD) model such as a .dwg file. An example model is provided and discussed below with reference to FIG. 2A.

Method 100 further comprises monitoring 3D printing progress at operation 104. Operation 104 may include receiving sensor data from one or more sensors. As an example, a 3D printer may include or be monitored by a variety of cameras (which may be capable of recording infrared, ultraviolet, and/or visible light), ultrasonic sound emitters and/or microphones, X-ray sensors, and the like. While the 3D printer is printing a physical object, the physical object can be scanned/monitored by the sensors. These sensors can provide data to a system performing method 100, which may analyze the data to determine a state of a work-in-progress (WIP) object. For example, a computer may analyze sensor data to generate a 3D model of the WIP object (a "WIP model"). An example WIP model is provided and discussed below with reference to FIG. 2B.

Operation 104 may further include determining whether 3D printing progress has deviated from the input model (i.e., the 3D model received at operation 102). For example, operation 104 may include comparing the state of the identified work-in-progress object to the 3D model received at operation 102. As an example, a portion of printed material that is not represented in the input model may be identified as a deviation. Similarly, a void (e.g., a gap, dimple, hole, etc.) where the input model depicts printed material may also be identified as a deviation. In contrast, a portion of a printed object that matches the model received at operation 102 (in size, density, shape, color, etc.) may not be identified as a deviation. As 3D printing is typically performed on a layer-by-layer basis, a system performing method 100 can be aware of which portions have been attempted vs. which have not. Therefore, the system may be unlikely to misinterpret a layer or portion that has not been printed yet as a deviation/void.

Method 100 further comprises determining whether 3D printing is complete at operation 106. If 3D printing is complete (106 "Yes"), method 100 ends at 108. If 3D printing is not complete (106 "No"), method 100 further comprises predicting a completed state of the 3D printing at operation 110. Operation 110 may include, for example, combining a WIP model generated at operation 104 with a 3D model received at operation 102. Operation 110 may include identifying "printed" portions of the base model, and designating other portions of the 3D model as "prospective" portions. Operation 110 may further include generating a predicted model based on adding the "to-be-printed" portions of the 3D model to the WIP model (including any deviations detected at operation 104). An example predicted model is provided and discussed below with reference to FIG. 2C.

Method 100 further comprises presenting the predicted completed state to a user at operation 112. Operation 112 may include, for example, transmitting a predicted model generated via operation 110 to a virtual reality (VR) interface. In some instances, the predicted model may implement effects to draw a user's attention to identified deviations. For example, deviations in the predicted model may be highlighted or otherwise emphasized; possible examples include adding an arrow pointing to a deviation, making the deviation glow a different color, making it blink, overlaying a specific texture at the deviation, etc. predicted model The VR interface may then enable the user to interact with the predicted model. For example, the VR interface may allow a user to rotate, enlarge, and/or otherwise manipulate the predicted model. This can advantageously enable a user to review and examine the predicted model at a higher level of detail when compared to, for example, watching the printing process. Further, some aspects of an object being 3D printed may be difficult (or even impossible) for a user to see with the naked eye without manipulating the object. For example, a user may not be able to see a deviation on an underside of an object being printed on a flat opaque surface without picking up the object to examine the underside. However, picking up the object before printing is complete may result in problems or even failure with the rest of the printing process. Thus, systems and methods consistent with the present disclosure may provide users with the benefits of being able to manipulate and rotate an object being printed without the associated drawbacks.

In some instances, the user may be able to toggle between viewing the predicted model, the WIP model, and the original input 3D model. In some instances, some portions of the object (such as portions that have not yet been printed, portions that have been printed correctly, etc.) may be deemphasized (e.g., they may be slightly transparent, presented with muted colors, etc.).

Further, the VR interface may allow a user to make changes to "prospective" portions of the model (i.e., portions that have yet to be printed). For example, a user interface may be provided which can enable the user to select portions of the model, such as by pointing with a controller connected to the VR system and pressing a designated button. The user may then be presented with options such as resize, move, rotate, etc., which, when selected, enable the user to modify the model. For example, a user may select a frame of a wheel-and-frame system, select "resize," select an inner wall of the frame, drag the inner wall towards an outer wall (making a structure of the frame thinner, but adding room to enable a wheel to rotate freely even if the wheel includes a deviation), and pressing a designated button to confirm (or preview) the change. In some instances, the user may be able to simulate motion of the predicted model in combination with other components. As an example, an additional option presented to the user may be "simulate functionality" which, when selected, may animate the predicted model based at least on received functionality data. For example, if the object being printed is a wheel to be attached to a device, the user may be able to simulate turning the wheel while it is attached to the device, allowing the user to determine whether the wheel will be able to turn.

Method 100 further comprises receiving updated instructions at operation 114. Operation 114 may include, for example, receiving an input via a VR interface and making adjustments to a predicted model based on that input. As an example, a user may interact with a predicted model of a wheel and a frame. The user may decide that the frame, which has not yet been printed, is too narrow to accommodate a portion of the wheel that has been printed. The user may then opt to widen the frame, inputting instructions via a user interface such as that described above. For example, operation 114 may include receiving instructions such as "widen component X by 10%," "rotate component Y by 3 degrees about axis Z," etc.

Method 100 further comprises revising the 3D model at operation 116. Operation 116 may include, for example, integrating the updated instructions received at operation 114 into the predicted mode, resulting in a revised model. For example, if the instructions received at operation 114 describe adjustments to a size of a component in a model, operation 116 may include adjusting the size of the component accordingly, and replacing the model received at operation 102 with the revised model. In some instances, the adjustments and revisions may be made to the predicted model, while in other instances, the adjustments and revisions may be made to the original model received at operation 102. This may depend upon implementation. As an example, a 3D model of a wheel and frame may be designed such that the wheel is to be 10 centimeters (cm) wide and the frame is to be 11 cm wide. However, a portion of the wheel may have been erroneously printed 12 cm wide, perhaps due to a miscalibration in the 3D printer. A predicted model may thus depict the wheel and frame with the printed portion of the wheel being 12 cm wide and the remaining prospective/ "to-be-printed" portions of the wheel being 10 cm wide, in line with the original model. Further, the predicted model may also depict the frame that as 11 cm wide. A user may be presented with this predicted model and, after reviewing it in VR, the user may opt to preemptively widen the frame to 13 cm. In some instances, replacing the original 3D model (which has a 10 cm wheel and 11 cm frame) with a revision of the predicted model (which has a wheel that is 12 cm in parts and 10 cm in other parts, along with a 13 cm frame) could cause problems in further printing due to the discontinuous nature of the wheel in the predicted model. Thus, in some instances, the original model may be revised instead, so the revised model generated and sent to the 3D printer at operation 114 may include a 10 cm wheel and a 13 cm frame. With the revised 3D model, method 100 returns to monitoring 3D printing progress at operation 104.

FIG. 2A is a 3D model of an example object 200 to be printed, consistent with several embodiments of the present disclosure. The example object 200 includes a wheel 202 and a frame 204. In some instances, the model depicted in FIG. 2A may be bundled with functionality data, such as information describing that wheel 202 is intended to rotate freely within frame 204. The dashed lines of FIG. 2A depict portions of the object that have yet to be printed. Thus, as shown in FIG. 2A, example object 200 may not have any printed portions. Note that example object 200 is presented merely as an abstract representation of a printing project.

FIG. 2B is a diagram depicting a work-in-progress (WIP) object 220 being 3D printed based upon the 3D model (but including a printing deviation 228), consistent with several embodiments of the present disclosure. WIP object 220 may be analyzed and monitored by various sensors (not shown in FIG. 2B), such as cameras, ultrasonic monitors, and the like. As shown in FIG. 2B, WIP object 220 includes a partially formed wheel 222 as well as a deviation 228. Defect 228 may be an unintended added mass erroneously printed onto wheel 222. Notably, no part of frame 204 has been printed for WIP object 222. Thus, while deviation 228 may interfere with rotation of wheel 222 (once printing is complete), a user may struggle to determine this without being able to compare deviation 228 to the planned frame. Therefore, even if the user notices deviation 228 by observing the printing process, the user may not be fully enabled to decide whether to end printing early or to proceed.

FIG. 2C is a diagram depicting a "predicted model" 240, generated based on a predicted final state of the work-in-progress object including the deviation, consistent with several embodiments of the present disclosure. Predicted model 240 includes completed wheel portion 242, remaining wheel portion 246, predicted frame 244, and deviation 248. A user reviewing predicted model 240 may be better poised to evaluate a severity of deviation 248; if the object depicted in predicted model 240 is completed, deviation 248 may collide with frame 244 if the wheel is rotated. For example, the user may be better able to see whether deviation 248 is large enough to make contact with frame 244 when the wheel is rotated; if deviation 248 would not make contact with frame 244, then the user may opt to proceed with printing (e.g., continue printing as initially instructed via model 200). However, if the user identifies that deviation 248 might interfere with rotation of the wheel, the user may opt to modify predicted model 240 to ensure that the final wheel will be able to rotate freely.

Figure 2E:
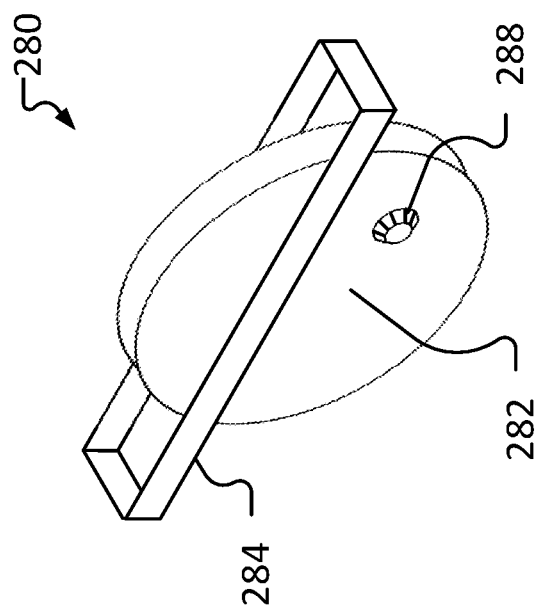
FIG. 2E is a diagram depicting a completed object, printed based upon a revised model, consistent with several embodiments of the present disclosure.
Figure 2D:
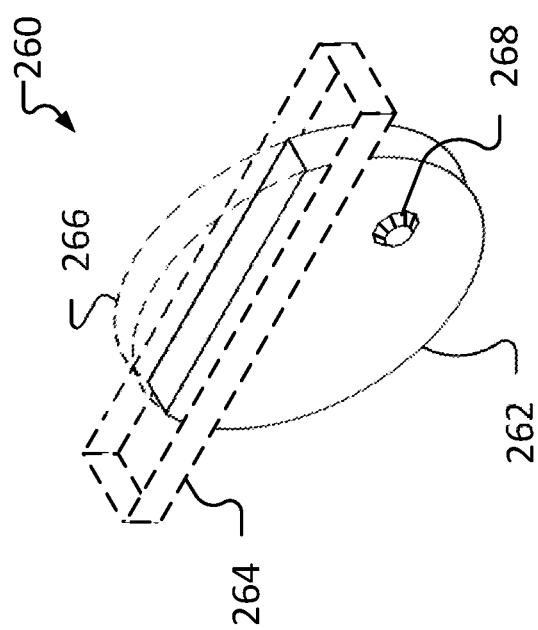
FIG. 2D is a diagram depicting a revised model, generated based upon updated instructions received via user input, consistent with several embodiments of the present disclosure.

FIG. 2D is a diagram depicting a "revised model" 260, generated based upon updated instructions received via user input, consistent with several embodiments of the present disclosure. As shown in FIG. 2D, revised model 260 has widened frame 264 (though frame 264 still has yet to be printed, and is therefore shown in dashed lines). Revised model 260 still includes partially printed wheel 262 and deviation 268, as well as prospective wheel portion 266. Revised model 260 may be sent to a 3D printer as updated instructions, causing the 3D printer to keep printing based on revised model 260.

Deviation 268 may still remain in revised model 260, as a 3D printer creating the object may be unable to remove material that has already been added. In instances where deviation 268 is a void (that should have been filled), a user may revise the model to fill the void. In some instances, the printer may be able to fill the void even if printing has progressed to another layer. However, in some instances, the void may eventually become inaccessible if printing continues long enough. For example, a design might include a 2 centimeter (cm)×2 cm×1 millimeter (mm) hollow chamber in an object; a 2 cm² square that is 1 mm in height. The 3D printer may print the object in 0.2 mm layers. Thus, 5 layers may omit a 2 cm² square of material. However, the first of these layers may omit a 2 cm×3 cm rectangular region of material instead of the designed 2 cm×2 cm; the "footprint" of the chamber may be too wide. Using systems and methods consistent with the present disclosure, the printer could be configured to return and fill in the 2 cm×1 cm void. However, if the printer is allowed to continue printing layers of the object as intended (i.e., with the appropriate 2 cm×2 cm omissions for the next 4 layers), the final object may have a 2 cm×1 cm×0.2 mm void adjacent to the hollow chamber. If the deviation is detected prior to the next layer being printed, the printer can be configured to return and correct it by filling in the void. However, once it is covered and the chamber is closed, the printer may be unable to access the chamber (and thus be unable to fill in the void). Thus, in some instances, detected voids may be automatically filled without waiting for user intervention. In some instances, the user may be notified of a detected void, but if the user does not respond to the notification, the void may be automatically filled. In some instances, printing may be suspended when deviations are about to made irreversible. For example, the printer may complete the layer including the deviation, and may even start the next layer, but the printer may suspend printing to await user input before it adds material that will prevent the printer from accessing the detected void.

FIG. 2E is a diagram depicting a completed object 280, printed based upon a revised model (such as revised model 260), consistent with several embodiments of the present disclosure. When compared to initial model 200, final object 280 is printed with a deviation 288 on wheel 282, but also a widened frame 284 (in comparison to frame 204). This way, wheel 282 may still be able to rotate within frame 284, in spite of deviation 288. Thus, the 3D printing project can be saved even with the deviation, preventing costs associated with discarding and restarting the project.

Figure 3:
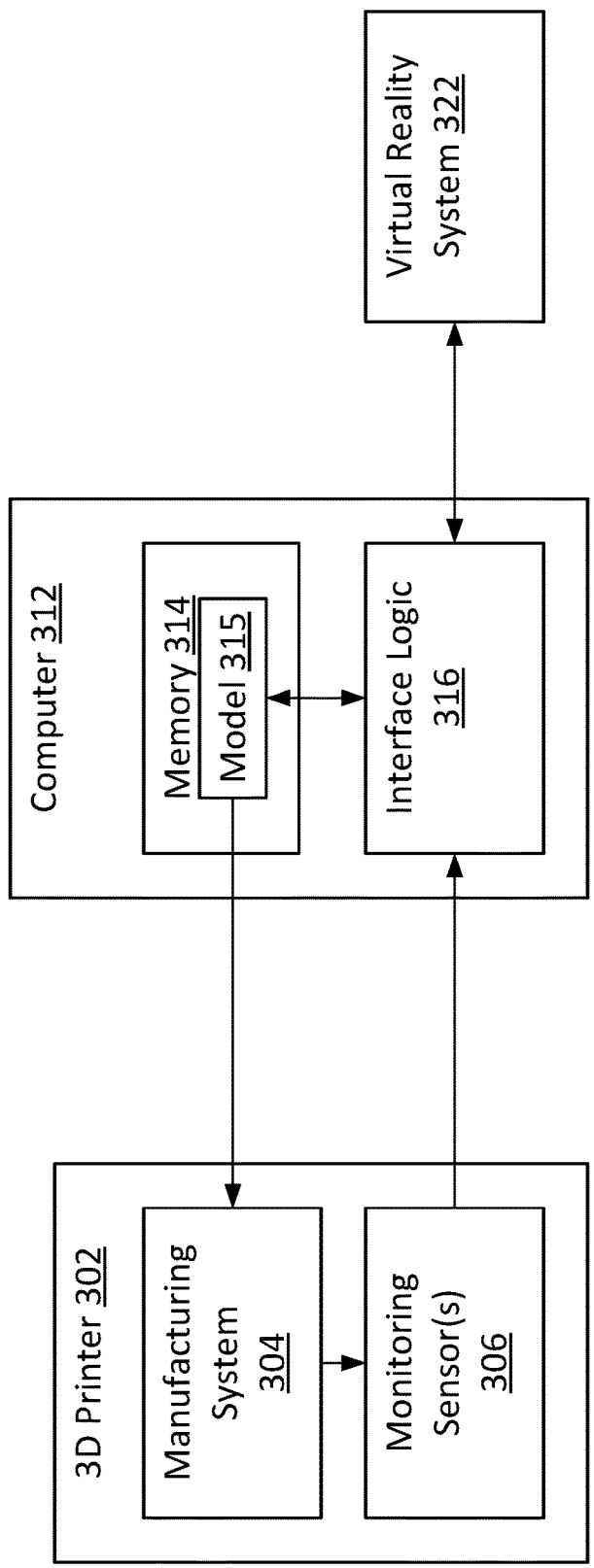
FIG. 3 is a schematic diagram of an example system for enabling users to review 3D printing progress and modify a 3D model during printing, consistent with several embodiments of the present disclosure.

FIG. 3 is a schematic diagram of an example system 300 for enabling users to review 3D printing progress and modify a 3D model during printing, consistent with several embodiments of the present disclosure. System 300 includes a 3D printer 302, which in turn includes a manufacturing system 304 and one or more monitoring sensors 306. System 300 further comprises computer 312. Computer 312 includes memory 314, which can store 3D model 315. Computer 312 further comprises interface logic 316. System 300 further comprises virtual reality system 322.

As an example, a user may design model 315 using computer 312. The user may then send model 315 to 3D printer 302. 3D printer 302 may then cause manufacturing system 304 to begin creating an object based on model 315. While manufacturing system 304 is creating the object, monitoring sensor(s) 306, which may include one or more cameras, microphones, x-ray scanners, ultrasonic sensors, etc., will record sensor data and transmit the sensor data back to computer 312. Interface logic 316 may coordinate the sensor data recorded from monitoring sensor(s) 306 and model data from memory 314 to generate a predicted model. Computer 312 can then send the predicted model to virtual reality system 322. Notably, virtual reality system 322 is not necessarily in a same locale as 3D printer 302; for example, computer 312 and/or virtual reality system 322 may be located in a user's home while 3D printer 302 may be located elsewhere, such as at a workplace. In some instances, the user could initiate printing on-site and then leave, being able to check on progress of the printing via virtual reality system 322. Further, interface logic 316 may, in conjunction with user input data from virtual reality system 322, enable a user of virtual reality system 322 to manipulate the predicted model of a predicted completed 3D printed object. The user may also be enabled to modify or revise the model, enabling adjustments to the object to be printed during the printing process.

Figure 4:
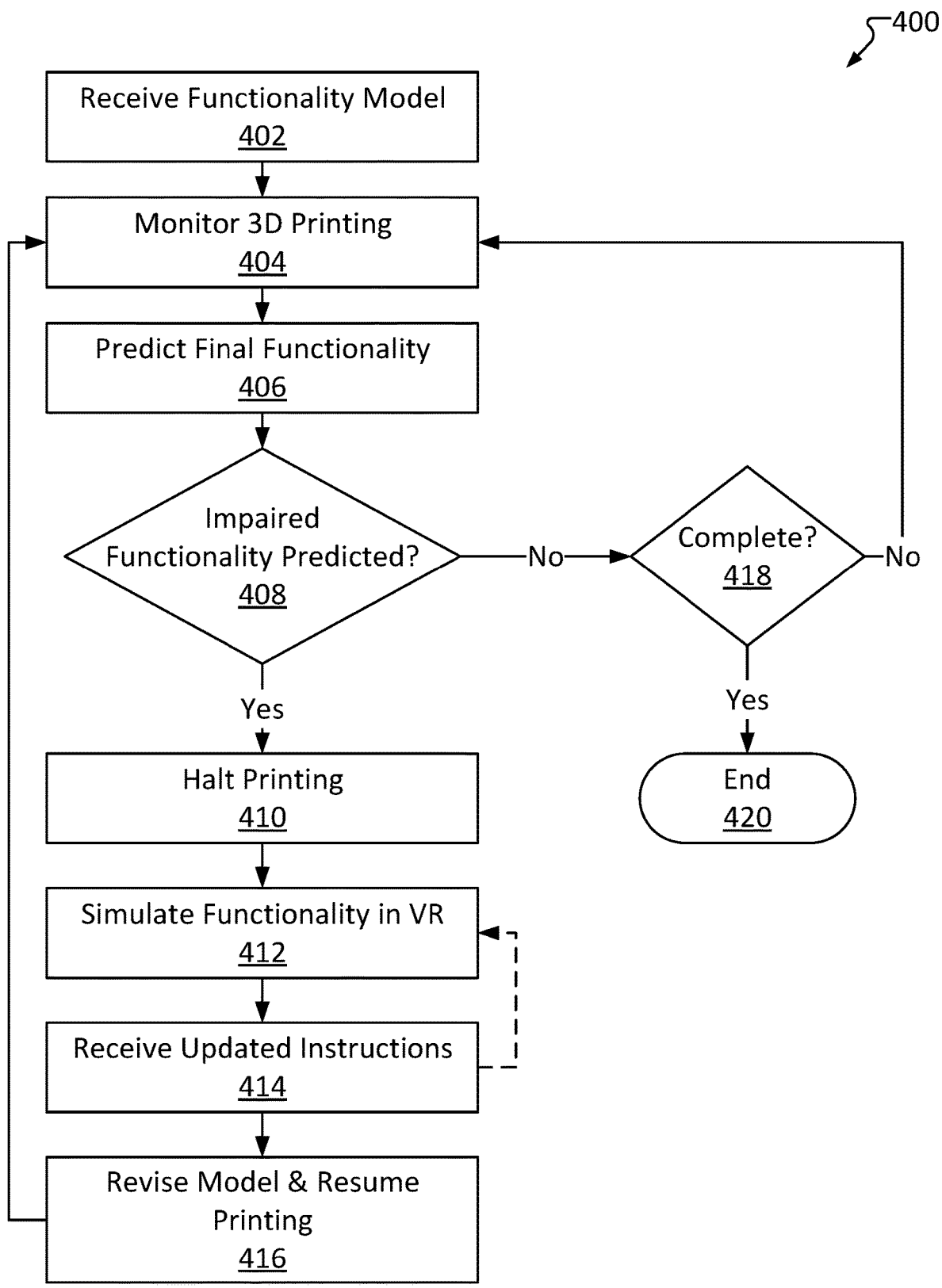
FIG. 4 is a method for predicting functionality of a final object including an identified printing defect, consistent with several embodiments of the present disclosure.

FIG. 4 is a method 400 for predicting functionality of a final object including an identified printing defect, consistent with several embodiments of the present disclosure. Method 400 comprises receiving a functionality model at operation 402. The functionality model received via operation 402 may include, for example, data describing a shape of an object as well as functionality data describing how the object is intended to operate. The functionality data may include a type of functionality, a portion of the model the functionality is to be applied to, and data describing parameters of the functionality. For example, in some instances, the object may be a wheel, and functionality data could describe that the wheel is intended to turn at least 360 degrees (e.g., is capable of making a full rotation) about a given axis. The functionality data may indicate that the type of functionality is "rotation," the portion of the model that the functionality is applied to is the wheel, and the parameters of the functionality include an amount the wheel is meant to be able to rotate as well as an axis of rotation for the wheel. In another instance, the object might be a door on a hinge, and the functionality data might describe that the door is intended to open by rotating about an axis of the hinge by at least 60°.

Method 400 further comprises monitoring 3D printing at operation 404. Operation 404 may be performed in a manner substantially similar to operation 104 of method 100, as described above with reference to FIG. 1. In short, operation 404 may include receiving sensor data from one or more sensors near or in a 3D printer, as well as analyzing the sensor data to identify a state of a 3D printing project. In some instances, operation 404 may include determining whether the 3D printing has deviated from the 3D model, such as in a manner substantially similar to operation 106 of method 100, as described above with reference to FIG. 1.

Method 400 further comprises predicting final functionality of the object being printed at operation 406. Operation 406 may include, for example, integrating the functionality data with the predicted model. As an example, a functionality model may include a wheel with functionality data describing the wheel's intended rotation, as described above (e.g., describing an axis that the wheel rotates around as wheel as a range of rotation the wheel should be able to achieve). Operation 406 may include generating a predicted model of the wheel (similar to operation 108 of method 100) and simulating rotation of the predicted wheel based on the functionality data. For example, if the predicted model includes a wheel with a deviation, operation 406 may include simulating rotation of the wheel (including the deviation) about the axis designated in the functionality data.

Method 400 further comprises determining whether the functionality of the predicted final object would be impaired at operation 408. Continuing with the wheel example, operation 408 may include determining, based on the simulated functionality, whether the predicted wheel is still able (or would still be able) to rotate as intended. For example, if the predicted wheel includes a deviation, operation 408 may include checking whether the deviation would collide with a frame of the wheel or otherwise prevent the wheel from turning as indicated by the functionality model. In some instances, a functionality threshold may be included to determine whether functionality is impaired. The functionality threshold may describe, for example, a percentage by which the functionality may be impacted. As an example, a hinge intended to rotate 150° may have a functionality threshold of 5%, such that if a deviation results in reducing the hinge's range of rotation to only 144°, the functionality may not be considered impaired (408 "No"). This is because 144° is 96% of 150°, so functionality is only reduced by 4%. Thus, 144° is still within the functionality threshold of 5%. The functionality threshold can be set by a user, and can be project-dependent. For example, while the hinge may have a functionality threshold of 5%, a wheel intended to rotate freely may have a functionality threshold of 0%, meaning any deviation that prevents the wheel from rotating freely may automatically be considered an impairment.

If the functionality of the object is predicted to be impaired (408 "Yes"), method 400 further comprises halting printing at operation 410. For example, operation 410 may include causing a manufacturing system of a 3D printer (such as, for example, system 304 of printer 302, discussed above with reference to FIG. 3) to cease manufacturing operations (e.g., stop adding material, etc.). In some instances, operation 410 may include slowing printing if possible, rather than completely halting. For example, printing operations may be slowed to a recommended minimum speed (which can be set by a user or default to a value determined by a manufacturer of the 3D printer).

Method 400 further comprises simulating functionality in virtual reality (VR) at operation 412. Operation 412 may include, for example, transmitting the predicted model to a VR system and enabling a user to interact with the predicted model (e.g., zooming in and out, adjusting perspective, making portions of the model transparent, etc.). Operation 412 may also include allowing the user to simulate functionality of the model, such as playing an animation of a wheel attempting to turn, etc.

In some embodiments, operation 412 may be performed in conjunction with operation 404. In other words, in some instances, a user may be able to review printing progress in virtual reality, even as printing progresses. Further, in some instances, operation 406 and operation 408 can be performed by the user based on operation 412. For example, the user can, via VR, review progress of a wheel being 3D printed. The user may then notice a deviation on the predicted wheel model and attempt to rotate the wheel as intended. Based on this, the user may determine that the deviation has impaired functionality of the wheel.

Method 400 further comprises receiving updated instructions at operation 414. Operation 414 may be performed in a substantially similar manner to operation 114, described above with reference to method 100. For example, a user may select portions of the model to adjust, resize, reshape, etc.

Method 400 further comprises revising the model (based on the updated instructions) and resuming printing at operation 416. Operation 416 may include, for example, sending a revised model to a 3D printer and causing the 3D printer to resume printing with the revised model. If the printing was merely slowed at operation 410 instead of stopped entirely, operation 416 may include returning printing to the previous (e.g., pre-operation 410) speed. In some instances, the user may be enabled to select a printing speed. Method 400 then returns to operation 404.

If predicted functionality is not impaired (408 "No"), method 400 proceeds to operation determining whether printing is complete at operation 418. If 3D printing is not complete (418 "No"), method 400 continues monitoring printing at operation 404. Once 3D printing is complete (418 "Yes"), method 400 ends at 420.

In some instances, even if predicted functionality is not predicted to be impaired (408 "No"), a user may still be able to halt printing via operation 410, review functionality in VR via operation 412, and revise the model at operation 414. In other words, in some instances, 408 "No" may not necessarily loop (via 418 "No") directly back to operation 404. For example, a user may wish to adjust or revise a model (for example, for aesthetics purposes) even if the model may still be predicted to function adequately.

Figure 5:
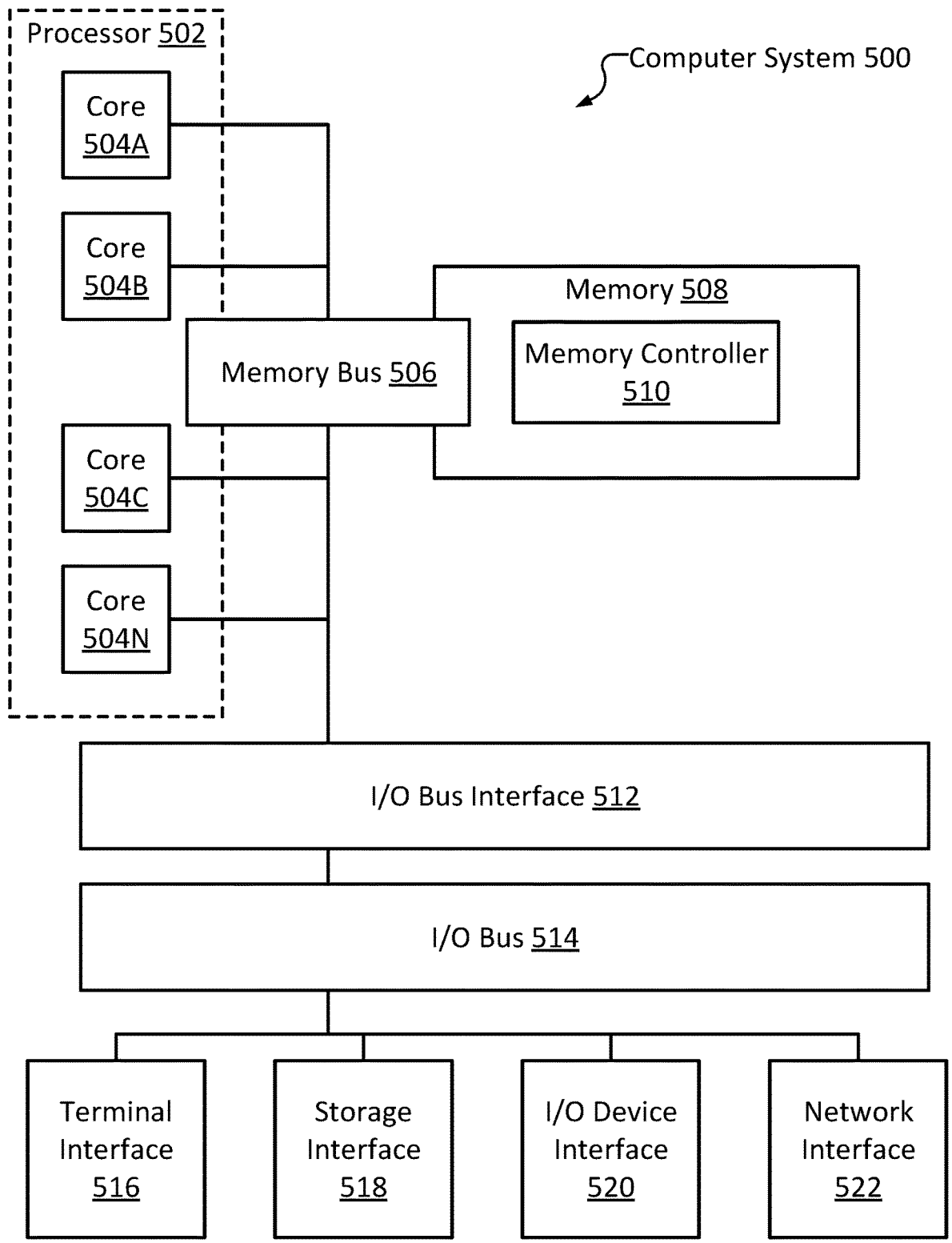
FIG. 5 illustrates a high-level block diagram of an example computer system that may be used in implementing embodiments of the present disclosure.

Referring now to FIG. 5, shown is a high-level block diagram of an example computer system 500 that may be configured to perform various aspects of the present disclosure, including, for example, methods 100 and 400, respectively. The example computer system 500 may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 508, a terminal interface 516, a storage interface 518, an I/O (Input/Output) device interface 520, and a network interface 522, all of which may be communicatively coupled, directly or indirectly, for inter-component communication via a memory bus 506, an I/O bus 514, and an I/O bus interface unit 512.

The computer system 500 may contain one or more general-purpose programmable central processing units (CPUs) 502, some or all of which may include one or more cores 504A, 504B, 504C, and 504D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 508 on a CPU core 504 and may comprise one or more levels of on-board cache.

In some embodiments, the memory subsystem 508 may comprise a random-access semiconductor memory, storage device, or storage medium (either volatile or non-volatile) for storing data and programs. In some embodiments, the memory subsystem 508 may represent the entire virtual memory of the computer system 500 and may also include the virtual memory of other computer systems coupled to the computer system 500 or connected via a network. The memory subsystem 508 may be conceptually a single monolithic entity, but, in some embodiments, the memory subsystem 508 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 502. This may include a memory controller 510.

Although the memory bus 506 is shown in FIG. 5 as a single bus structure providing a direct communication path among the CPU 502, the memory subsystem 508, and the I/O bus interface 512, the memory bus 506 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 512 and the I/O bus 514 are shown as single respective units, the computer system 500 may, in some embodiments, contain multiple I/O bus interface units 512, multiple I/O buses 514, or both. Further, while multiple I/O interface units are shown, which separate the I/O bus 514 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving a 3D model representing a virtual object having a plurality of parts, wherein one part is designed to move with respect to another part;
   monitoring, via sensors, 3D printing of a physical object;
   comparing, based on the monitoring, measured sizes of portions of the physical object to sizes of portions of the 3D model;
   identifying, based on the comparing, a deviation in the physical object;
   generating, based on the identifying, a predicted model using the measured sizes of portions of the physical object and the sizes of portions of the 3D model, wherein the predicted model is a predicted final state that includes the deviation in the physical object;
   transmitting the 3D model and the predicted model to a virtual reality interface;
   presenting the 3D model and the predicted model to a user via the virtual reality interface; and
   simulating functionality of the predicted model using functionality data of the virtual object, including checking for collisions between the predicted model and the another part, which the predicted model moves with respect to, in a virtual reality environment.

2. The method of claim 1, further comprising identifying, based on the comparing, a dimensional volumetric deviation in the physical object.

3. The method of claim 2, wherein the predicted model includes the dimensional volumetric deviation.

4. The method of claim 1, further comprising:
   determining, based on the simulating, a percentage of impairment of functionality of the virtual object.

5. The method of claim 1, further comprising:
receiving, via the virtual reality interface, a user input; and
updating the presenting based on the user input.

6. The method of claim 1, further comprising:
receiving, via the virtual reality interface, a user input;
revising the 3D model based on the user input, resulting in a revised 3D model; and
transmitting the revised 3D model to a 3D printer.

7. The method of claim 1, wherein simulating the functionality of the predicted model includes animating the predicted model to check for interference with the another part.

8. A system, comprising:
a memory, the memory storing computer-executable instructions; and
a central processing unit (CPU) coupled to the memory, the CPU configured to:
receive a 3D model representing a virtual object having a plurality of parts, wherein one part is designed to move with respect to another part;
monitor, via sensors, 3D printing of a physical object;
compare, based on the monitoring, measured sizes of portions of the physical object to sizes of portions of the 3D model;
identify, based on the comparing, a deviation in the physical object;
generate, based on the identifying, a predicted model using the measured sizes of portions of the physical object and the sizes of portions of the 3D model, wherein the predicted model is a predicted final state that includes the deviation in the physical object;
transmit the 3D model and the predicted model to a virtual reality interface; and
present the 3D model and the predicted model to a user via the virtual reality interface; and
simulate functionality of the predicted model using functionality data of the virtual object, including checking for collisions between the predicted model and the another part, which the predicted model moves with respect to, in a virtual reality environment.

9. The system of claim 8, wherein the CPU is further configured to identify, based on the comparing, a dimensional volumetric deviation in the physical object.

10. The system of claim 9, wherein the predicted model includes the dimensional volumetric deviation.

11. The system of claim 8, wherein the CPU is further configured to:
determine, based on the simulating, a percentage of impairment of functionality of the virtual object.

12. The system of claim 8, wherein the CPU is further configured to:
receive, via the virtual reality interface, a user input; and
update the presenting based on the user input.

13. The system of claim 8, wherein the CPU is further configured to:
receive, via the virtual reality interface, a user input;
revise the 3D model based on the user input, resulting in a revised 3D model; and
transmit the revised 3D model to a 3D printer.

14. The system of claim 8, wherein simulating the functionality of the predicted model includes animating the predicted model to check for interference with the another part.

15. A computer program product, the computer program product comprising a computer readable storage medium having program instructions embodied therewith, the program instructions executable by a computer to cause the computer to:
receive a 3D model representing a virtual object having a plurality of parts, wherein one part is designed to move with respect to another part;
monitor, via sensors, 3D printing of a physical object;
compare, based on the monitoring, measured sizes of portions of the physical object to sizes of portions of the 3D model;
identify, based on the comparing, a deviation in the physical object;
generate, based on the identifying, a predicted model using the measured sizes of portions of the physical object and the sizes of portions of the 3D model, wherein the predicted model is a predicted final state that includes the deviation in the physical object;
transmit the 3D model and the predicted model to a virtual reality interface; and
present the 3D model and the predicted model to a user via the virtual reality interface; and
simulate functionality of the predicted model using functionality data of the virtual object, including checking for collisions between the predicted model and the another part, which the predicted model moves with respect to, in a virtual reality environment.

16. The computer program product of claim 15, wherein the instructions further cause the computer to identify, based on the comparing, a dimensional volumetric deviation in the physical object.

17. The computer program product of claim 16, wherein the predicted model includes the dimensional volumetric deviation.

18. The computer program product of claim 15, wherein the instructions further cause the computer to:
determine, based on the simulating, a percentage of impairment of functionality of the virtual object.

19. The computer program product of claim 15, wherein the instructions further cause the computer to:
receive, via the virtual reality interface, a user input;
revise the 3D model based on the user input, resulting in a revised 3D model; and
transmit the revised 3D model to a 3D printer.

20. The computer program product of claim 15, wherein simulating the functionality of the predicted model includes animating the predicted model to check for interference with the another part.

* * * * *